United States Patent [19]

Scribner et al.

[11] 4,147,071

[45] Apr. 3, 1979

[54] LOW BACKLASH GEAR REDUCTION ASSEMBLY

[75] Inventors: Jack B. Scribner; Edward W. Moorman; James S. Payne, all of Dayton, Ohio

[73] Assignee: TRW Inc., Cleveland, Ohio

[21] Appl. No.: 874,109

[22] Filed: Feb. 1, 1978

[51] Int. Cl.[2] .................... F16H 55/18; F16H 1/12; B23C 9/00
[52] U.S. Cl. ...................... 74/409; 74/421 A; 90/22
[58] Field of Search ................ 74/409, 421 A, 440; 90/22

[56] References Cited

U.S. PATENT DOCUMENTS

| | | | |
|---|---|---|---|
| 2,382,846 | 8/1945 | Barber | 74/306 |
| 2,641,937 | 6/1953 | Erhardt, Jr. et al. | 74/409 |
| 2,703,497 | 3/1955 | Townsend | 74/409 X |
| 3,020,775 | 2/1962 | Musser | 74/440 |
| 3,396,594 | 8/1968 | Walker | 74/409 |
| 3,803,936 | 4/1974 | Kroeper | 74/409 |

Primary Examiner—Leonard H. Gerin
Attorney, Agent, or Firm—Biebel, French & Nauman

[57] ABSTRACT

A precision gear reduction assembly for a gear train assembly for a gear train incorporates a backlash control in which the intermediate gear shaft has one end only mounted within an eccentric bushing. The bushing provides for the adjustment of the intermeshing of the final two gears of the gear train by tilting the intermediate shaft slightly as the bushing is rotated to achieve the desired degree of backlash control.

4 Claims, 6 Drawing Figures

U.S. Patent
Apr. 3, 1979
4,147,071
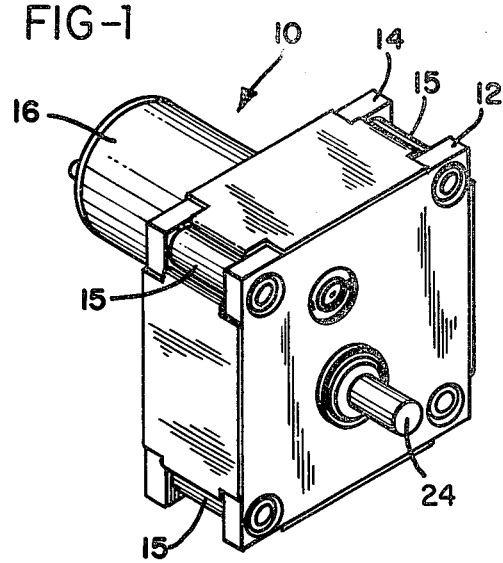
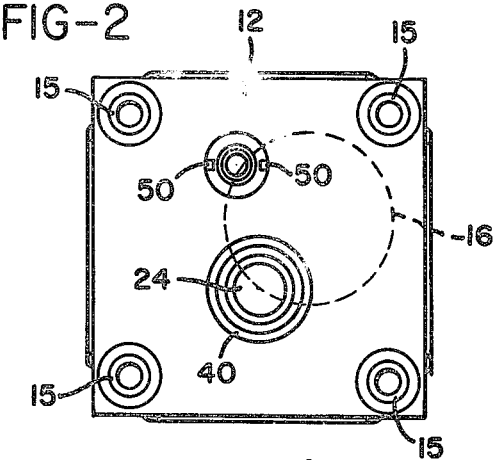
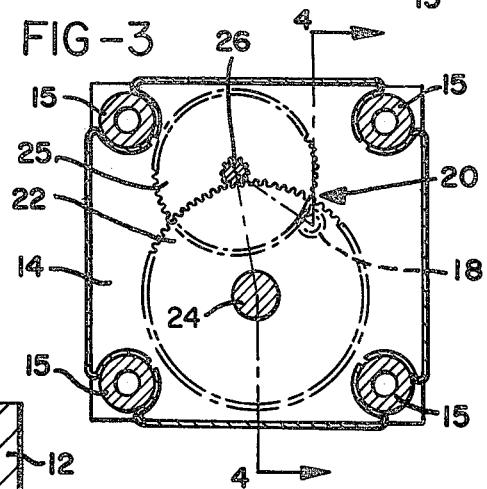
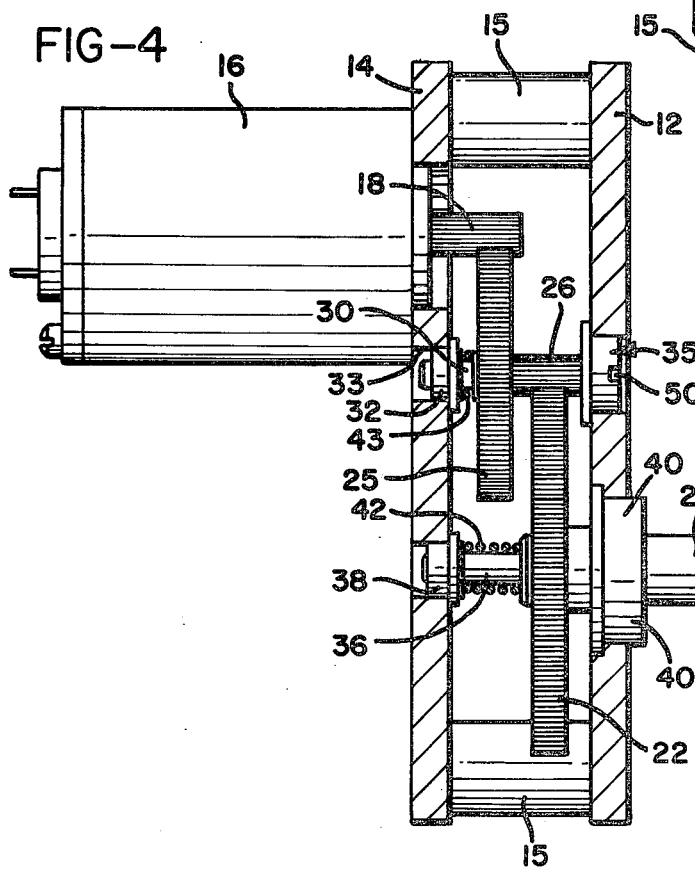
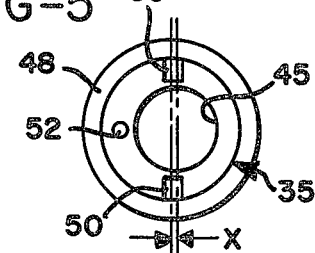
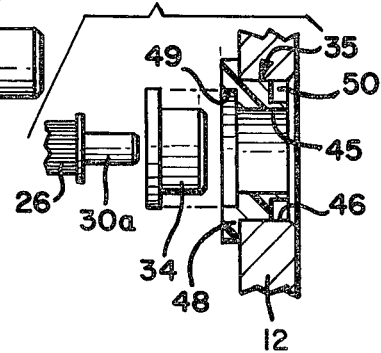

LOW BACKLASH GEAR REDUCTION ASSEMBLY

BACKGROUND OF THE INVENTION

This invention relates to precision gear reduction units, and more particularly to gear reduction units having very low backlash.

It is known that the control of the extent of backlash within a required range may be accomplished by holding the gear dimension and the center distance tolerances to extremely close limits. In a gear reduction unit the free play between the gears at the input stage is less critical than at the output or second stage, by reason of the gear reduction factor. Many designs have been proposed in the past to remove backlash from gear trains, including arrangements for loading the gears, such as by using split gears and the like. However, these arrangements tend to increase the torque or power requirements to drive the gear reduction unit. Where very low drive torques are available, it has been necessary to make high precision gears and then match the gear selectively, or to position one gear along an inclined or canted shaft to remove the backlash. Also, backlash eliminating arrangements have been suggested as shown in the U.S. Pat. of Barber, No. 2,382,846 issued Aug. 14, 1945, in which each end of the shaft supporting a planatary gear is mounted for rotation within an eccentric bushing, thus requiring two eccentrics to be adjusted to remove the backlash.

SUMMARY OF THE INVENTION

The present invention is directed to a motor driven reduction gear assembly which is specifically adapted for low torque requirements with a minimum of backlash. For example, the reduction gear assembly of the present invention is particularly adapted for positioning a variable tuning capacitor of a radio receiver. The invention is applied in a two-stage spur gear reduction driven by a small DC motor. The gear reduction assembly is generally of conventional design in that an input pinion is cut on the motor shaft and meshes directly with the gear portion of a gear-pinion intermediate cluster, which, in turn, meshes with the bull gear of an output shaft. The gear-pinion cluster and the bull gear are rotatably mounted between a pair of parallel, spaced-apart plates and the backlash is controlled by adjusting the intermesh of the intermediate pinion with the bull gear.

It has been found that the necessity for hand matching the gears or sliding the intermediate gear along an inclined shaft is eliminated by mounting one end of the shaft, preferably at the pinion end, within an eccentric bushing. After assembly, the assembler is able to adjust the mesh from too tight to sloppy loose, and then the eccentric bushing is locked into proper angular position to achieve the desired degree of backlash.

It is accordingly an important object of this invention to provide a simple and yet effective arrangement for reducing or eliminating backlash in a gear reduction train without increasing the drive torque requirements.

Another object of the invention is the provision of a gear reduction train in which the final drive gear is mounted on a shaft in which one end only is supported within an eccentric bushing for the purpose of adjusting the intermesh between it and the output gear.

These and other objects and advantages of the invention will be apparent from the following description, the accompanying drawings and the appended claims.

BRIEF DESCRIPTION OF THE DRAWING

FIG. 1 is a perspective view of a motor driven reduction unit in accordance with the invention hereof;

FIG. 2 is a front elevation thereof;

FIG. 3 is a view similar to FIG. 2 with the front bearing plate removed;

FIG. 4 is a vertical section, taken generally along the line 4—4 of FIG. 3;

FIG. 5 is an enlarged elevational view of the eccentric bushing mounted in the bearing plate; and FIG. 6 is an exploded view showing the manner in which the eccentric bushing is received in the bearing plate.

DESCRIPTION OF THE PREFERRED EMBODIMENT

A gear reduction unit in accordance with this invention is illustrated generally at 10 in FIG. 1 as having a pair of spaced-apart parallel front and back bearing plates 12 and 14 which rotatably support the gearing therebetween. The spacing of the plates is maintained by tubular spaces 15 at the four corners thereof, which receive internal threaded connections or rivets joining the plates together. A miniature electric drive motor 16 is mounted on the back plate 14 and has an input pinion 18 cut directly on the motor shaft.

The gear reduction unit 10 is a two-stage spur gear reducer which includes an intermediate gear-pinion cluster illustrated generally at 20 in FIG. 3. An output or bull gear 22 is mounted on an output shaft 24. The intermediate cluster 20 includes a large driven gear 25 in running engagement with the pinion 18 and a smaller output pinion 26 in running engagement with the bull gear 22. The gear cluster 20, including the gear 25 and pinion 26, are mounted for rotation together on a common transverse shaft 30. The end of the shaft 30 adjacent the gear 25 is received within a flanged bearing 32, and the bearing 32 is received within a recess 33 formed in the plate 14. The opposite end of the shaft 30 adjacent the pinion 26 is shown in FIG. 6 as being mounted in a second flanged bearing 34 identical to the bearing 32. The bearing 34 is, in turn, received within an eccentric bushing illustrated generally at 35 in FIGS. 5 and 6, the details of which are described below.

As noted, the bull gear 22 is mounted on the output shaft 24, and the back end of this shaft 24 is reduced in diameter as indicated at 36 and is, in turn, mounted in a flanged ball bearing 38 received within a suitable bearing opening formed in the rear plate 14. The forward end of the shaft 24 is received within a substantially larger bearing 40 received within a bearing opening formed in the front plate 12 and supports the forward or output end of the shaft 24.

A coil spring 42 on the shaft section 36 urges the gear 22 and shaft to the right as viewed in FIG. 4 and assures a given axial position of the gear 22. Similarly a coil spring 43 on the shaft 30 between the bearing 32 and the gear 25 assures a given running position of the cluster 20.

As described above, the invention includes means mounting the shaft 30 supporting the cluster 20 in the plate 12 for eccentric movement about the axis of the shaft, to provide for control of the degree of intermesh between the pinion gear 26 and the spur gear 22 for the elimination of backlash within the train. The backlash between the pinion gear 26 and the spur gear 22 is substantially more critical than that between the drive pinion 18 and the gear 25, in view of the fact that the backlash at the latter position is reduced by reason of the gear reduction factor when reflected at the output shaft 24.

For this purpose the end 30a of the shaft 30 adjacent the pinion 26 is mounted for eccentric movement with respect to the plate 12. The support bushing 35 is formed with a bearing-receiving opening 45 which is offset from the axis of the opening 46 within the plate 12 by a small amount as identified by the dimension "x" in FIG. 5. The bushing 35 is provided with a flange 48 which is received against the inside surface of the plate 12. Further, the bushing opening 45 is relieved at 49 to receive the flange or shoulder of the bearing 34.

When precision gears are used, such as AGMA quality 14 for the gears 22 and 26, a very small eccentric adjustment is required, and the shaft tilting movement caused by rotation of the bushing 35 within the plate 12 is easily accommodated by the slight tilting movement of the shaft 30 within the opposite bearing 32. The bushing 35 is preferably molded of a high density plastic material, and is provided with a pair of oppositely positioned notches 50 at its forward surface to receive a spanner tool for rotational adjustment. An index mark 52 may also be provided on the forward surface.

After the gears have been assembled within the housing defined by the plates 12 and 14, including the mounting of the motor 16, the angular position of the bushing 35 may be selected as to provide the desired degree of backlash between the input pinion 18 and the output shaft 24. When this position is found the material of the plate 12 may be swaged into the slots 50 to assure the maintenance of the desired running position. For example, a two-stage spur gear reducer was made in accordance with the drawings provided 3 inch-ounces at the output shaft 24 at a nominal speed of 120 rpm. The overall gear reduction between the motor 16 and the output shaft 24 was approximately 86 to 1. The gears 18 and 25 were made to AGMA quality 11 tolerances while the gears 26 and 22 were made to AGMA quality 14 tolerances. The bushing 35 was provided with an offset "x" equal to 0.003", provided backlash adjustment so that with the input gear 14 clamped in a rigid position, there was no more than four minutes of rotation of the output shaft 24 under an 8 inch-ounce reverse load. The gear train provided only about 1/15 of 1° of backlash and yet operated with very low friction.

While the form of apparatus herein described constitutes a preferred embodiment of this invention, it is to be understood that the invention is not limited to this precise form of apparatus, and that changes may be made therein without departing from the scope of the invention.

What is claimed is:

1. In a reduction gear assembly in which a pinion gear drives a gear-pinion cluster mounted on a shaft which in turn drives a bull gear, the improvement in backlash control comprising means mounting one end of said shaft for eccentric adjustment at the pinion end thereof only in a motion toward and away from intermesh with said bull gear.

2. The assembly of claim 1 in which said shaft mounting means includes an eccentric bushing, a bushing mounting plate, said bushing mounted in said plate for rotational adjusting movement, and a bearing supporting said shaft on one end in said bushing.

3. In a precision speed reduction gear train comprising an input spur gear, a pair of spaced parallel plates, a transverse first shaft rotatably mounted between said plates, a gear-pinion cluster mounted on said shaft with the gear in running engagement with said input spur gear, a second shaft rotatably mounted on said plates, a bull gear on said second shaft in running engagement with the pinion portion of said gear-pinion cluster, and means mounting one end of said first shaft in one of said plates for eccentric movement about the axis of said shaft providing a variation in the intermesh between said pinion and said bull gear for elimination of backlash.

4. The gear train of claim 3 further including ball bearing means rotatably supporting each end of said shaft, and said eccentric adjustment means comprising a plastic sleeve having an eccentric opening therein receiving one of said bearings and being mounted for rotation in said plate, said sleeve having index means thereon to facilitate location of said sleeve within said plate.

* * * * *